United States Patent
Arool Emmanuel et al.

(10) Patent No.: US 10,382,075 B1
(45) Date of Patent: Aug. 13, 2019

(54) SYSTEM FOR LIMITING INTERFERENCE TO A WIRELESS RADIO OF A COMPUTING DEVICE

(71) Applicant: AMAZON TECHNOLOGIES, INC., Seattle, WA (US)

(72) Inventors: Cyril Arokiaraj Arool Emmanuel, Cupertino, CA (US); Gokul Ramsubbaraj, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/717,584

(22) Filed: Sep. 27, 2017

(51) Int. Cl.
*H04B 1/04* (2006.01)
*H04B 7/06* (2006.01)
*H04B 1/00* (2006.01)

(52) U.S. Cl.
CPC ......... *H04B 1/0475* (2013.01); *H04B 1/0067* (2013.01); *H04B 7/0602* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,331,289 B1* | 12/2012 | Lee | .......... | H04B 1/006 370/328 |
| 2007/0183338 A1* | 8/2007 | Singh | .......... | H04W 16/14 370/252 |
| 2008/0045152 A1* | 2/2008 | Boes | .......... | H04W 16/14 455/63.1 |
| 2011/0009060 A1* | 1/2011 | Hsu | .......... | H04W 52/16 455/41.2 |
| 2013/0035041 A1* | 2/2013 | Sen | .......... | H04B 15/00 455/63.3 |
| 2013/0143494 A1* | 6/2013 | Chen | .......... | H04W 8/22 455/41.2 |
| 2014/0328194 A1* | 11/2014 | Sen | .......... | H04W 72/082 370/252 |
| 2016/0242071 A1* | 8/2016 | Chen | .......... | H04W 28/18 |

* cited by examiner

*Primary Examiner* — Junpeng Chen
(74) *Attorney, Agent, or Firm* — Lindauer Law, PLLC

(57) ABSTRACT

Described are techniques for reducing the effects of interference from one wireless radio on the operations of another wireless radio. A first wireless radio and a second wireless radio may transmit signals within frequency ranges that at least partially overlap. Signal quality values for the first wireless radio, at a time that the second wireless radio is transmitting signals, may be determined for at least a portion of the overlapping frequencies. For each frequency at which the determined signal quality value deviates from a threshold value, that frequency may be excluded from use for subsequent communications by the first wireless radio. Excluding certain frequencies from use may enable continuous use of the first wireless radio without experiencing the effects of interference from the second wireless radio.

20 Claims, 6 Drawing Sheets

US 10,382,075 B1

SYSTEM FOR LIMITING INTERFERENCE TO A WIRELESS RADIO OF A COMPUTING DEVICE

BACKGROUND

Many devices include multiple wireless radios, each radio capable of communication using a different communication protocol, such as Wi-Fi or Bluetooth. Concurrent use of both wireless radios may create interference that limits the signal quality associated with one or both of the radios.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
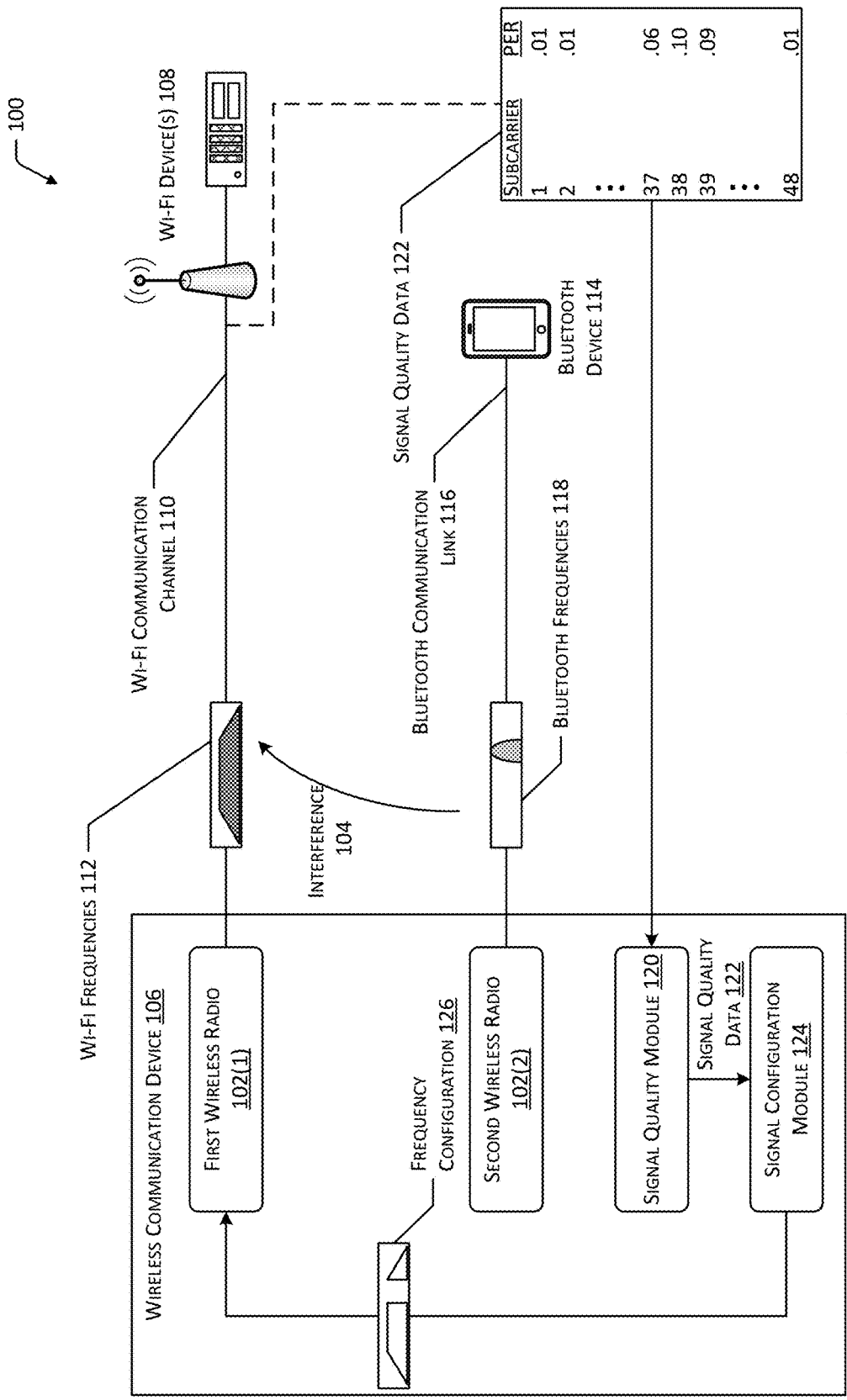
FIG. 1 depicts an implementation of a system for configuring the frequencies used by a first wireless radio based on interference caused by a second wireless radio.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A wireless device may communicate with other devices using multiple wireless radios, each radio configured to use a different communication protocol. For example, a first wireless radio in a device may transmit and receive signals using a Wi-Fi protocol while a second wireless radio may transmit and receive signals using a Bluetooth protocol. In some cases, different wireless radios within a device may share components of the device. For example, a wireless chipset may include one or more die, antennae, and radio frequency (RF) chains that are shared by Wi-Fi, Wi-Fi Direct, Bluetooth, and Bluetooth Low Energy technologies. In other cases, one or more antennae, RF chains, or other components may be used specifically by a Wi-Fi radio, while other components are used specifically by a Bluetooth radio.

Signals associated with different communication protocols may include overlapping frequency ranges. For example, a Wi-Fi protocol may include a protocol compliant with at least a portion of Institute of Electrical and Electronics Engineers IEEE specification 802.11, such as 802.11g and 802.11n. A Wi-Fi network may include multiple channels, each channel spanning a range of frequencies. A communication channel of a Wi-Fi network may be divided into multiple subcarriers, each of which may correspond to a certain frequency or frequency range, and each of which may be offset from an adjacent subcarrier by a given frequency to prevent interference. A Bluetooth protocol may include a protocol compliant with at least a portion of one or more of IEEE specification 802.15.1 or a standard promulgated by the Bluetooth Special Interest Group. Bluetooth signals typically occupy a smaller range of frequencies when compared to the frequencies associated with a Wi-Fi communication channel, however the frequencies associated with Bluetooth communication signals may overlap those associated with at least a portion of the subcarriers used by a Wi-Fi radio. Therefore, when a wireless device concurrently uses both a Wi-Fi radio and a Bluetooth radio, the transmission or receipt of signals associated with the Bluetooth radio may interfere with the transmission or receipt of signals associated with the Wi-Fi radio. For example, a packet error rate (PER) associated with use of a Wi-Fi communication channel may increase during times when a Bluetooth radio is used. In some cases, if the interference to the Wi-Fi radio caused by the Bluetooth radio is significant, the signal quality associated with the Wi-Fi radio may be reduced to a level that limits or prevents use of the Wi-Fi radio. To enable coexistence between Wi-Fi and Bluetooth communications, a device may be configured to cease use of one communication protocol while transmitting or receiving signals using another communication protocol.

Described in this disclosure are techniques for limiting the interference to a first wireless radio caused by a second wireless radio while enabling continued use of the first wireless radio. In some implementations, the first wireless radio may be configured to transmit and receive signals using a Wi-Fi communication channel, and the second wireless radio may be configured to transmit signals using a Bluetooth communication link. However, in other implementations, one or more wireless radios may be used to transmit signals associated with other communication protocols, such as ZigBee, Wi-Fi Direct, Bluetooth Low Energy, and so forth.

The first wireless radio may be used to transmit a test signal on a communication channel to determine a baseline packet error rate. In some implementations, one or more other baseline signal quality values may be determined in place of or in addition to the packet error rate. For example, a baseline received signal strength indicator (RSSI), a baseline signal-to-noise ratio (SNR), a baseline received channel power indicator (RCPI), a baseline data transfer rate, or other values indicative of signal strength or quality may be determined based on the test signal. The first wireless radio may then be used to transmit a subsequent first signal, while the second radio is concurrently used to transmit a second signal associated with a different protocol. For example, the first wireless radio may transmit a first signal on a Wi-Fi channel while the second radio transmits a second signal using a Bluetooth communication link. In some implementations, the second signal may include a continuous wave signal. The second signal may be transmitted at a first frequency that corresponds to a first subcarrier of the Wi-Fi channel. A packet error rate associated with transmission of the first signal may be determined, and if the packet error rate exceeds the baseline packet error rate by at least a threshold error rate, the first radio may be configured to transmit and receive signals without using the first subcarrier of the Wi-Fi channel. Conversely, if the packet error rate for a frequency does not exceed the baseline packet error rate by at least the threshold error rate, the first radio may be configured to transmit and receive signals using the corresponding subcarrier of the Wi-Fi channel. This process may be repeated for multiple frequencies used by the second radio. For example, a Bluetooth radio transmitting a continuous wave signal may transition multiple frequencies using the continuous wave signal, and at one or more of the frequencies, a packet error rate for the first radio may be determined.

In some implementations, the second radio may also modify a power level associated with transmission of signals. For example, if the packet error rate or other signal quality value associated with the first radio deviates from a threshold error rate or other threshold signal quality value, the second radio may transmit a subsequent signal using a lower power level or decrease a power level associated with a current signal. Continuing the example, transmission of a signal by a Bluetooth radio at a particular frequency and a first power level may reduce a signal quality value associated with a Wi-Fi radio below a threshold minimum signal quality value. However, transmission of a signal at the particular frequency and a second power level less than the first power level may not reduce the signal quality value below the threshold minimum signal quality value. In such a case, the second radio may be configured to transmit signals at the particular frequency using a power level less than or equal to the second power level.

In some implementations, the techniques described herein may be repeated using live traffic associated with one or both wireless radios. For example, Bluetooth traffic may affect one or more frequencies of a Wi-Fi communication channel in a manner that a continuous wave signal does not. Therefore, transmitting or receiving Bluetooth traffic using a Bluetooth radio and determining a packet error rate or other signal quality value associated with the Wi-Fi radio concurrent with the transmission or receipt of Bluetooth traffic may identify one or more frequencies of the Wi-Fi channel that are affected by the Bluetooth traffic. In response to this determination, the Wi-Fi radio may be configured to refrain from using portions of the communication channel (e.g., selected subcarriers) associated with the frequencies affected by the Bluetooth traffic.

Based on the determined signal quality values for the first radio, a data structure that associates frequencies associated with the communication channel with corresponding modifications to the transmission or receipt of signals by one or both radios may be generated. For example, the data structure may include a table that associates a first frequency with an indication that the first frequency is excluded from use by the first radio due to interference caused by the second radio. Continuing the example, if concurrent use of the first radio and second radio increased the packet error rate associated with the first radio by more than a threshold error rate or decreased the signal quality of the first radio to less than a threshold minimum signal quality, the data structure may indicate that the particular frequency should be unused by the first radio. Subsequent use of the first radio may refrain from use of the particular frequency based on the data structure. As another example, the data structure may associate a second frequency with a particular power level of the second radio that does not significantly interfere with the first radio. Based on correspondence between subsequent traffic associated with the second radio and the data structure, the power level for signals that are transmitted using the second frequency may be maintained at a power level less than or equal to the particular power level.

In addition to limiting the frequencies used by a first radio and the power levels used by a second radio, in some implementations, one or more antennae associated with the first radio may be prevented from use during times when a second radio is in use. For example, a Wi-Fi radio of a device may include multiple antennae. Each antenna may exhibit a respective isolation value that is indicative of a quantity of mutual coupling between that antenna and another antenna of the device. The isolation value for a particular antenna may be based at least in part on one or more of relative placement with respect to another antenna, type of antenna, radiation pattern, polarization, or other characteristics. Isolation may be measured in decibel (dB) or a similar unit, with larger values indicating a greater amount of isolation and consequently, less interference from one antenna that affects one or more other antennae. For example, the isolation value between a first antenna and a second antenna may be 20 dB. Smaller isolation values may be associated with a decrease in the efficiency of one or both antennae during operation, due to interference from another mutually coupled antenna. In other implementations, isolation may be measured in dimensionless units.

Depending on the size of a device and the placement of components within the device, the antennae of wireless radios within the device may not have sufficient physical separation in the way of spacing to provide sufficient isolation. Insufficient isolation may result in the use of one antenna affecting use of another antenna.

In response to an increase in a packet error rate associated with the Wi-Fi radio or a decrease in a signal quality value, the Wi-Fi radio may be configured to use the antenna associated with the greater isolation value for subsequent transmissions and refrain from use of the antenna associated with the lesser isolation value. For example, as the packet error rate is determined to increase, a first antenna may be selected that exhibits a greater isolation value with respect to a second antenna. Continuing the example, a Wi-Fi radio may include two antennae, each antenna having an isolation value indicative of physical distance or mutual coupling between the particular antenna and an antenna of a Bluetooth radio. Therefore, transmission using the Bluetooth radio may interfere to a greater extent with the use of the Wi-Fi antenna having the smaller isolation value than with use of the Wi-Fi antenna having the larger isolation value. To at least partially mitigate the effect of interference on use of the Wi-Fi radio, when the Bluetooth radio is transmitting data, the Wi-Fi antenna associated with the greater isolation value may be used while the Wi-Fi antenna having the lesser isolation value is excluded from use.

FIG. 1 depicts an implementation of a system 100 for configuring the frequencies used by a first wireless radio 102(1) based on interference 104 caused by a second wireless radio 102(2). A wireless communication device 106 may include multiple wireless radios 102, each of which is configured to communicate using a different communication protocol. For example, as shown in FIG. 1, the first wireless radio 102(1) may be configured to communicate using a Wi-Fi protocol while the second wireless radio 102(2) is configured to communicate using a Bluetooth protocol. The wireless communication device 106 may include any type of computing device including, without limitation, a laptop computer or other personal computer, a smartphone, tablet computer, wearable computer, or other portable or mobile computing device, an automotive computer, a set-top box, a server, an audio or video output device, a remote control or game controller, an access point, and so forth. For example, both the first wireless radio 102(1) and the second wireless radio 102(2) may be associated with a communication chipset or circuit within the wireless communication device 106. Each wireless radio 102 may include one or more antennae, each of which may be physically separated from each other antenna by a distance that results in a particular isolation value for that antenna. For example, the first wireless radio 102(1) may have two antennae, each of which is separated from an antenna of the second wireless radio 102(2) by a respective distance.

The first wireless radio 102(1) is shown in communication with one or more Wi-Fi devices 108 via a Wi-Fi communication channel 110. For example, the first wireless radio 102(1) may be configured to transmit and receive data from the Wi-Fi devices 108 using a communication link with a wireless access point or similar network device. The Wi-Fi communication channel 110 may be associated with multiple Wi-Fi frequencies 112. For example, a Wi-Fi communication channel 110 may span a wide range of frequencies (e.g., 22 megahertz) and may include multiple subcarriers configured to transmit data, each subcarrier corresponding to a particular range of frequencies and offset from a subsequent subcarrier by a selected frequency interval to prevent interference between the subcarriers. Continuing the example, a Wi-Fi communication channel 110 may include 52 subcarriers of which 48 subcarriers are used to transmit data, each subcarrier offset from an adjacent subcarrier by approximately 312.5 kilohertz. Using each of the subcarriers to transmit data may maximize the data throughput associated with use of the Wi-Fi communication channel 110.

The second wireless radio 102(2) is shown in communication with a Bluetooth device 114 via a Bluetooth communication link 116. The Bluetooth communication link 116 may be associated with a narrow range of Bluetooth frequencies 118 (e.g., 1 megahertz), at least a portion of which may overlap with the Wi-Fi frequencies 112. As such, when the second wireless radio 102(2) is used to transmit signals via the Bluetooth communication link 116, this transmission may interfere with the transmission or receipt of signals using the Wi-Fi communication channel 110 due to the frequencies that are common between the Bluetooth frequencies 118 and the Wi-Fi frequencies 112. The effect of the interference 104 on use of the first wireless radio 102(1) may be determined in part based on the physical distance between the antennae of the first wireless radio 102(1) and one or more antennae of the second wireless radio 102(2). For example, if the first wireless radio 102(1) is attempting to transmit data using each subcarrier supported by the Wi-Fi frequencies 112, the interference 104 associated with the second wireless radio 102(2) may cause a packet error rate for a portion of the Wi-Fi frequencies 112 that overlap with the Bluetooth frequencies 118 to increase. The increased packet error rate may result in a larger number of retransmissions and failed transmissions, which may limit or prevent use of the Wi-Fi communication channel 110. In some cases, a wireless communication device 106 may be configured to cease use of the first wireless radio 102(1) when the second wireless radio 102(2) is in use to prevent failed transmissions or degradation in the quality of a Wi-Fi communication. In other implementations, a first wireless radio 102(1) having multiple antennae may be configured to use the antenna having the largest isolation value with respect to isolation from the antenna(e) of the second wireless radio 102(2), while ceasing use of at least one antenna having a smaller isolation value.

The system 100 of FIG. 1 may enable concurrent use of the first wireless radio 102(1) and second wireless radio 102(2) by determining particular portions of the Wi-Fi communication channel 110 (e.g., particular subcarriers) that are affected by the interference 104 associated with the second wireless radio 102(2). Specifically, particular Bluetooth frequencies 118 that, when used, cause a packet error rate or other signal quality value associated with use of the Wi-Fi communication channel 110 to change by at least a threshold amount may be identified. Then, the subcarriers of the Wi-Fi communication channel 110 that use Wi-Fi frequencies 112 that correspond to the Bluetooth frequencies 118 that are the source of the interference 104 may be suppressed from use. While use of only a portion of the Wi-Fi frequencies 112 may reduce the overall data throughput associated with the Wi-Fi communication channel 110, the reduction or elimination of erroneous or missed packets, retransmissions, and failed transmissions caused by the interference 104 may improve the overall quality of communication using the Wi-Fi communication channel 110.

A signal quality module 120 associated with the wireless communication device 106 may determine signal quality data 122 associated with the Wi-Fi communication channel 110. For example, the signal quality module 120 may determine a packet error rate associated with each subcarrier supported by the Wi-Fi frequencies 112. In some implementations, a packet error rate may be determined at a first time, in the absence of a transmission using the second wireless radio 102(2), such as by transmitting a test signal using the first wireless radio 102(1) to determine a baseline packet error rate for each subcarrier. Subsequently, the second wireless radio 102(2) may be used to transmit a signal, such as a continuous wave signal, while the first wireless radio 102(1) is concurrently used to transmit a signal and determine packet error rates for the subcarriers. Differences between the baseline packet error rate and a packet error rate determined during the transmission by the second wireless radio 102(2) may indicate errors caused by interference 104 from the second wireless radio 102(2). The signal quality data 122 may therefore associate particular Wi-Fi frequencies 112 or subcarriers with corresponding measured packet error rates or changes in packet error rate measurements at times when the second wireless radio 102(2) was used to transmit a signal. In other implementations, the signal quality module 120 may determine other signal quality values, such as a RSSI, RCIP, SNR, or data transfer rate associated with use of the Wi-Fi communication channel 110.

A signal configuration module 124 associated with the wireless communication device 106 may determine, based on the signal quality data 122, particular Wi-Fi frequencies 112 or subcarriers affected by the interference 104. For example, the signal configuration module 124 may determine particular Wi-Fi frequencies 112 or subcarriers having a packet error rate, or other signal quality value, that deviates from a threshold value. As another example, the signal configuration module 124 may determine particular Wi-Fi frequencies 112 or subcarriers having a packet error rate, or other signal quality value that differs from a baseline value by more than a threshold quantity. The signal configuration module 124 may generate a frequency configuration 126 that includes frequencies or subcarriers that are not significantly affected by the interference 104 while excluding frequencies or subcarriers that are more significantly affected by the interference 104. The frequency configuration 126 may be provided to the first wireless radio 102(1) to cause the first wireless radio 102(1) to transmit signals using a first portion of the Wi-Fi frequencies 112 while refraining from use of a second portion of the Wi-Fi frequencies 112. In some implementations, in addition to configuration of the first wireless radio 102(1) to use the first portion of the Wi-Fi frequencies 112, the first wireless radio 102(1) may also be configured to exclude one or more antennae from use. For example, if the first wireless radio 102(1) includes multiple antennae the antenna having the largest isolation value with respect to an antenna of the second wireless radio 102(2) may be used while one or more antennae having a smaller isolation value may be excluded from use.

While FIG. 1 depicts the signal quality module 120 and the signal configuration module 124 within the wireless communication device 106, in other implementations, one or more of the signal quality module 120 or the signal configuration module 124 may be associated with another computing device in communication with the wireless communication device 106. For example, a server or other remote computing device may determine the signal quality data 122 from one or more of the wireless computing devices 106 or the Wi-Fi device(s) 108. The remote computing device may then determine the frequency configuration 126 and provide the frequency configuration 126 to the wireless computing device 106.

Figure 2:
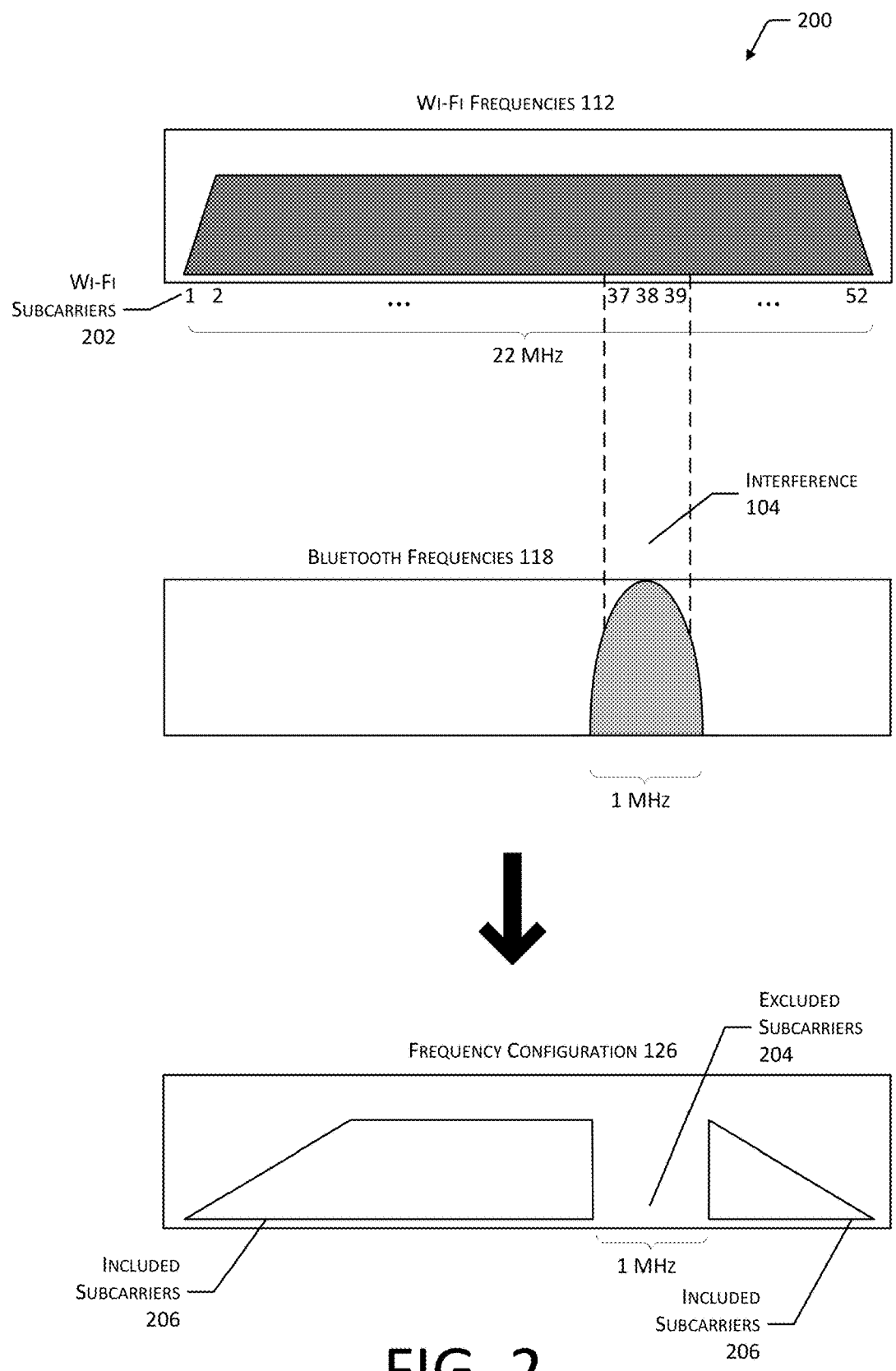
FIG. 2 is a diagram illustrating a frequency configuration for a wireless radio.

FIG. 2 is a diagram 200 illustrating a frequency configuration 126 for a wireless radio 102. As described with regard to FIG. 1, a first wireless radio 102(1) of a wireless communication device 106 may communicate using a Wi-Fi protocol. For example, a Wi-Fi network may include multiple Wi-Fi communication channels 110, each channel spanning a range of Wi-Fi frequencies 112. Continuing the example, a Wi-Fi communication channel 110 may include 22 megahertz of frequencies. A Wi-Fi communication channel 110 may be subdivided into multiple Wi-Fi subcarriers 202. For example, a 22 megahertz Wi-Fi communication channel 110 may include 52 Wi-Fi subcarriers 202 that are used to transmit data, each of which is spaced from a subsequent Wi-Fi subcarrier 202 by a frequency of 312.5 kilohertz. Use of each of the Wi-Fi subcarriers 202 associated with a Wi-Fi communication channel 110 may maximize the data throughput associated with the Wi-Fi communication channel 110.

A second wireless radio 102(2) of the wireless communication device 106 may communicate using a Bluetooth protocol. For example, transmissions using a Bluetooth communication link 116 may utilize a range of Bluetooth frequencies 118. Continuing the example, transmissions using a Bluetooth communication link 116 typically include 1 megahertz of frequencies. In some cases, at least a portion of the Bluetooth frequencies 118 may overlap with at least a portion of the Wi-Fi frequencies 112. For example, as depicted in FIG. 2, the Bluetooth frequencies 118 wholly overlap a portion of the Wi-Fi frequencies 112. Specifically, the Bluetooth frequencies 118 overlap the Wi-Fi frequencies 112 that correspond to three of the Wi-Fi subcarriers 202. Therefore, when the second wireless radio 102(2) is used to transmit signals using the Bluetooth communication link 116 these transmissions may generate interference 104 that affects a portion of the Wi-Fi subcarriers 202 having frequencies that overlap with the Bluetooth frequencies 118. However, use of the second wireless radio 102(2) may not necessarily interfere with other Wi-Fi subcarriers 202. Additionally, in some cases, only a portion of the Bluetooth frequencies 118 may interfere with use of the first wireless radio 102(1)

If the first wireless radio 102(1) continued to transmit signals using each of the Wi-Fi subcarriers 202, the interference 104 from the second wireless radio 102(2) may cause a number of packet transmissions to fail to an extent that limits or prevents use of the Wi-Fi communication channel 110. For example, transmission of packets using the Wi-Fi subcarriers 202 that overlap the Bluetooth frequencies 118 may result in numerous failed transmissions, or retransmissions. However, if only the specific Wi-Fi subcarriers 202 affected by the interference 104 from the second wireless radio 102(2) are excluded from use, the first wireless radio 102(1) may continue to be used uninterrupted. Elimination of one or more Wi-Fi subcarriers 202 from use may decrease the data throughput associated with the Wi-Fi communication channel 110, but to a lesser extent than continued use of the first wireless radio 102(1) at a time when the first wireless radio 102(1) is subject to interference 104.

Therefore, a signal configuration module 124 associated with the wireless communication device 106 may generate a frequency configuration 126 based in part on the Wi-Fi frequencies 112, the Bluetooth frequencies 118, and signal quality data 120 associated with use of the first wireless radio 102(1). The frequency configuration 126 may include one or more excluded subcarriers 204. The excluded subcarriers 204 may correspond to the Wi-Fi subcarriers 202 that are affected by the interference 104 from the second wireless radio 102(2) due to the shared frequencies between the excluded subcarriers 204 and the Bluetooth frequencies 118. The frequency configuration 126 may also include one or more included subcarriers 206 that are not significantly affected by interference 104 from the Bluetooth frequencies 118.

Figure 3:
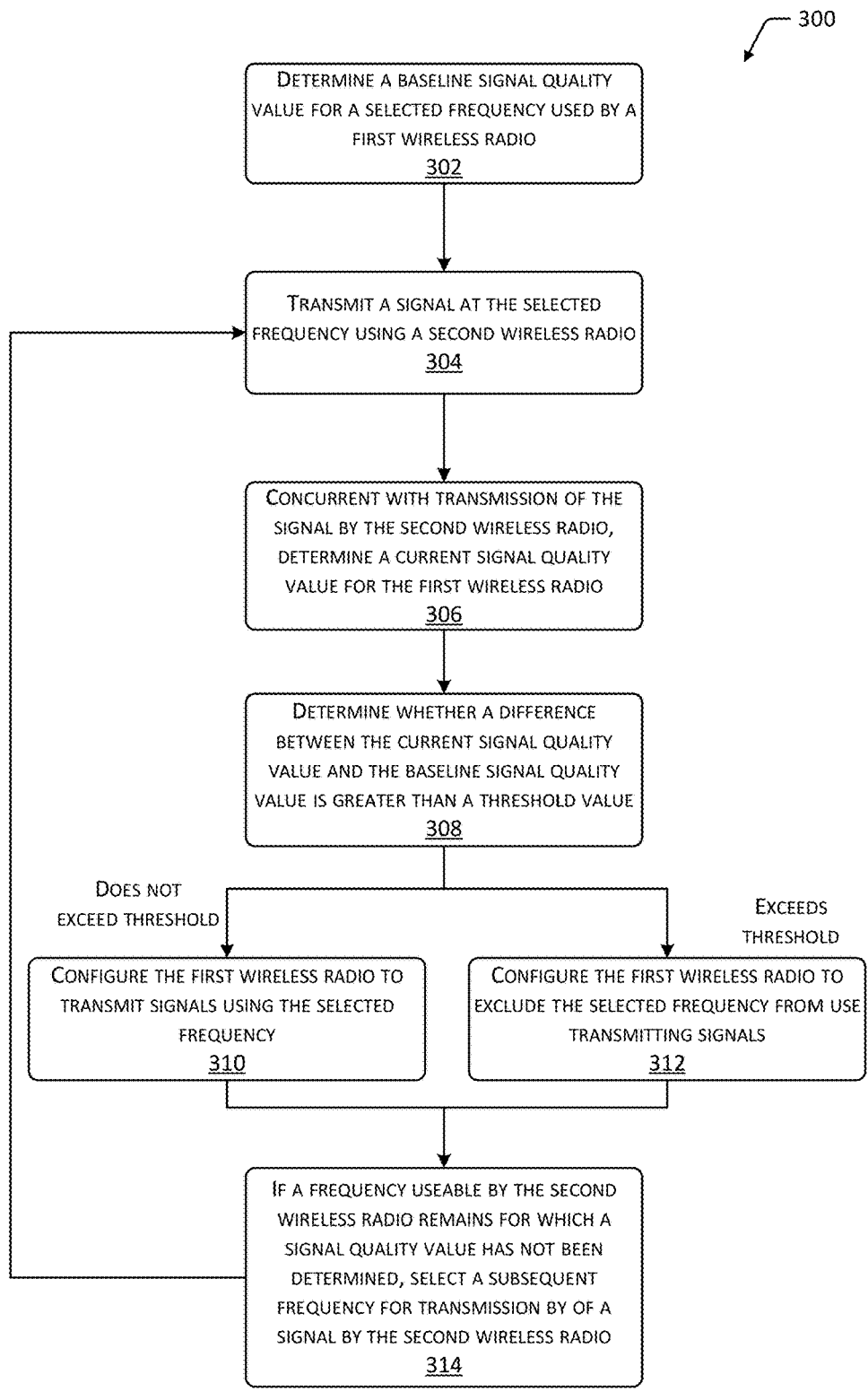
FIG. 3 is a flow diagram illustrating a method for configuring frequencies used by a first wireless radio based on signal quality values determined during use of a second wireless radio.

FIG. 3 is a flow diagram 300 illustrating a method for configuring frequencies used by a first wireless radio 102(1) based on signal quality values determined during use of a second wireless radio 102(2). At block 302, a baseline signal quality value for a selected frequency used by a first wireless radio 102(1) may be determined. For example, the first wireless radio 102(1) may be used to transmit a test signal at one or more frequencies, such as the Wi-Fi frequencies 112 of a Wi-Fi communication channel 110 described with regard to FIG. 1. A packet error rate or other signal quality value associated with the transmission of the signal at one or more of the frequencies may then be determined. Other baseline signal quality values may include a baseline RSSI, baseline RCIP, baseline SNR, or baseline data transfer rate. In some implementations, signal quality values may be determined from the first wireless radio 102(1) or measured by a module associated with a wireless communication device 106 that includes the first wireless radio 102(1). In other implementations, signal quality values may be determined by a device receiving the signal from the first wireless radio 102(1). For example, a Wi-Fi device 108 receiving a test signal from the first wireless radio 102(1) using a Wi-Fi communication channel 110 may determine a signal strength or other characteristics of the transmission from the first wireless radio 102(1).

At block 304, a signal may be transmitted at the selected frequency of block 302 using a second wireless radio 102(2). For example, the second wireless radio 102(2) may be used to transmit a continuous wave signal, a test signal, or live traffic at one or more frequencies that include the selected frequency. Transmission, by the second wireless radio 102(2) at the selected frequency, concurrent with a transmission, by the first wireless radio 102(1) at the selected frequency may enable an effect of the transmission by the second wireless radio 102(2) on the first wireless radio 102(1) to be determined.

At block 306, concurrent with transmission of the signal by the second wireless radio 102(2), a current signal quality value for the first wireless radio 102(1) may be determined. For example, the first wireless radio 102(1) may be used to transmit a subsequent signal concurrent with the transmission by the second wireless radio 102(2) at block 304. Then, a signal quality value associated with the transmission may be measured by one or more of the first wireless radio 102(1), a module associated with the wireless communication device 106 that includes the first wireless radio 102(1), or a device receiving the signal from the first wireless radio 102(1).

At block 308, a difference between the current signal quality value, determined at block 306, and the baseline signal quality value, determined at block 302, may be determined and compared to a threshold value. The threshold value may include a quantity by which a signal quality value may change if affected by interference 104 from the second wireless radio 102(2). If the difference between the baseline signal quality value and the current signal quality value does not exceed the threshold value, the method may proceed to block 310. At block 310, the first wireless radio 102(1) may be configured to transmit signals using the selected frequency. Because transmissions by the first wireless radio 102(1) at the selected frequency are not significantly interfered with by transmissions of the second wireless radio 102(2), the first wireless radio 102(1) may continue using the selected frequency without significantly compromising communications using the first wireless radio 102(1). If the difference between the baseline signal quality value and the current signal quality value is greater than the threshold value, the method may proceed to block 312. At block 312, the first wireless radio 102(1) may be configured to exclude the selected frequency from use transmitting signals. For example, because transmissions by the first wireless radio 102(1) at the selected frequency are interfered with by transmissions using the second wireless radio 102(2), preventing the first wireless radio 102(1) from using the selected frequencies may enable continued concurrent use of both wireless radios 102 without compromising communications using the first wireless radio 102(1).

At block 314, a determination may be made as to whether a frequency usable by the second wireless radio 102(2) remains for which a signal quality has not been determined for the first wireless radio 102(1). For example, the second wireless radio 102(2) may include a Bluetooth radio capable of transmitting at multiple frequencies within a one megahertz frequency range. Blocks 304 through 312 may be repeated for each frequency at which the second wireless radio 102(2) is capable of transmitting signals. If a signal quality value has been determined for each frequency useable by the second wireless radio 102(2), the frequencies determined at blocks 310 and 312 may be used to generate a frequency configuration 126 for the first wireless radio 102(1). For example, a frequency configuration 126 that enables continued use of the first wireless radio 102(1) without transmission failures caused by interference 104 from the second wireless radio 102(2) may exclude use of frequencies for which the current signal quality value at block 308 differed from the baseline signal quality value by more than a threshold value.

Figure 4:
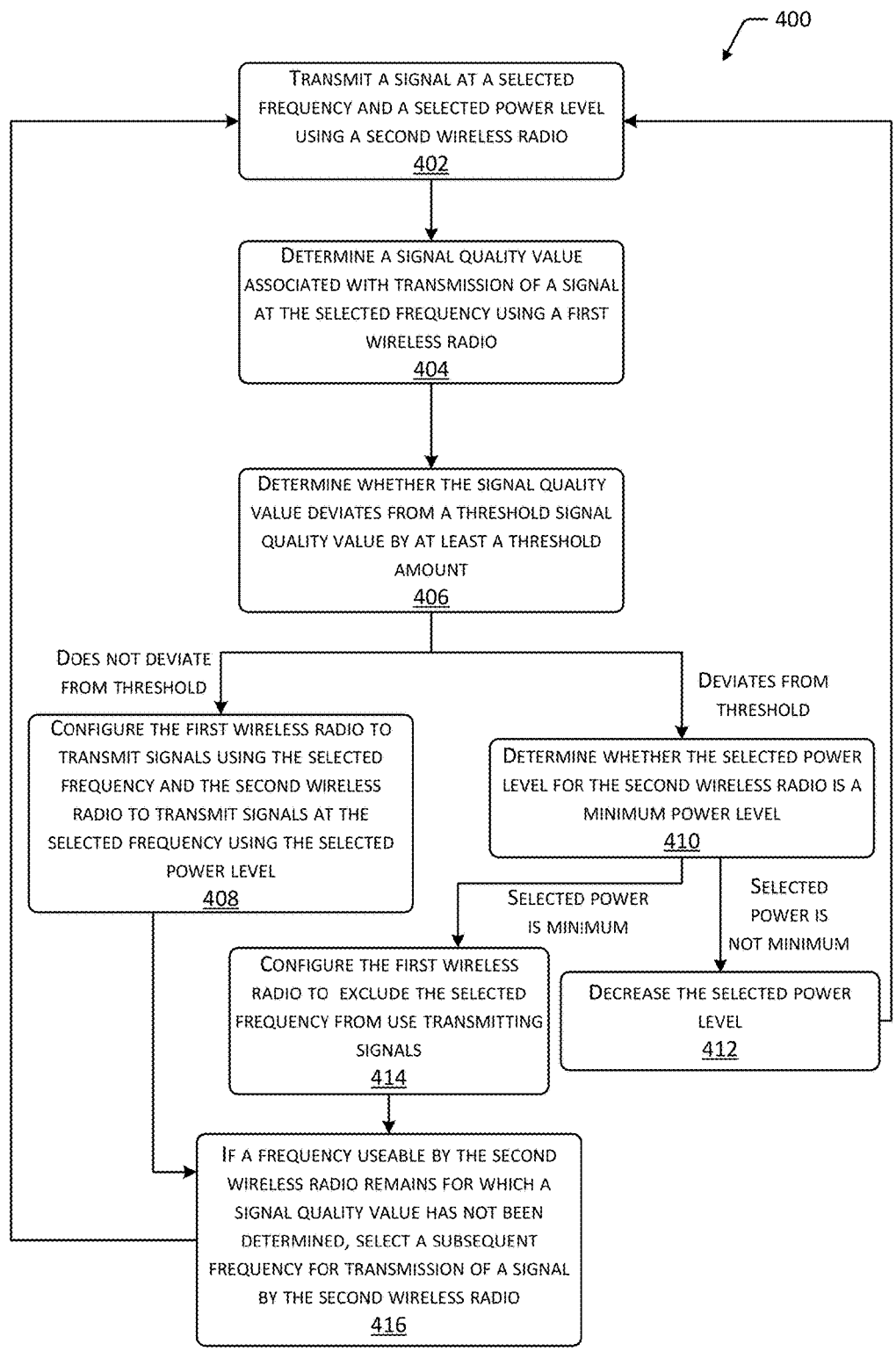
FIG. 4 is a flow diagram illustrating a method for configuring frequencies used by a first wireless radio and power levels used by a second wireless radio to limit interference to the first wireless radio from the second wireless radio.

FIG. 4 is a flow diagram 400 illustrating a method for configuring frequencies used by a first wireless radio 102(1) and power levels used by a second wireless radio 102(2) to limit interference to the first wireless radio 102(1) from the second wireless radio 102(2). At block 402, the second wireless radio 102(2) may be used to transmit a signal at a selected frequency and a selected power level. For example, the second wireless radio 102(2) may be used to transmit a continuous wave signal, a test signal, or one or more other types of signals.

At block 404, a signal quality value associated with transmission of a signal at the selected frequency, using the first wireless radio 102(1), may be determined. For example, the first wireless radio 102(1) may be used to transmit a signal concurrent with the transmission by the second wireless radio 102(2). Concurrent use of the first wireless radio 102(1) and second wireless radio 102(2) may enable the effect of interference 104 from the second wireless radio 102(2) on transmissions by the first wireless radio 102(1) to be determined. For example, the signal quality value for the first wireless radio 102(1) determined at block 404 may be affected by interference 104 from the second wireless radio 102(2).

At block 406, a determination may be made as to whether the signal quality value determined at block 404 deviates from a threshold signal quality value by at least a threshold amount. In some implementations, the threshold signal quality value may include a minimum signal quality value indicative of interference 104 from the second wireless radio 102(2). For example, in the absence of interference 104, the signal quality value for the first wireless radio 102(1) may be expected to exceed the threshold minimum signal quality value. However, if interference 104 from the second wireless radio 102(2) affects a transmission by the first wireless radio 102(1), the signal quality value for the first wireless radio 102(1) may be less than the threshold minimum signal quality value. In other implementations, the threshold signal quality value may include a value that is a selected quantity greater than or less than a baseline signal quality value. For example, a baseline packet error rate for the first wireless radio 102(1) may be determined at a time when the second wireless radio 102(2) is not in use. The threshold signal quality value may include a threshold error rate that is greater than the baseline packet error rate by a selected amount indicative of interference 104 from the second wireless radio 102(2). As another example, a baseline signal strength value for the first wireless radio 102(1) may be determined at a time when the second wireless radio 102(2) is not in use. The threshold signal quality value may include a threshold signal strength that is less than the baseline signal strength value by a selected amount indicative of interference 104 from the second wireless radio 102(2).

If the signal quality value for the first wireless radio 102(1) does not deviate from the threshold signal quality value by at least a threshold amount, the method may proceed to block 408. At block 408, the first wireless radio 102(1) may be configured to transmit signals using the selected frequency, and the second wireless radio 102(2) may be configured to transmit signals at the selected frequency using the selected power level. For example, if transmissions by the first wireless radio 102(1) are not significantly interfered with by transmissions of the second wireless radio 102(2) at the selected power level, then the selected frequency may be used concurrently by both wireless radios 102, with the second wireless radio 102(2) transmitting using the selected power level.

If the signal quality value for the first wireless radio 102(1) deviates from the threshold signal quality value by at least a threshold amount, the method may proceed to block 410. At block 410, a determination may be made as to whether the selected power level for the second wireless radio 102(2) is a minimum power level. If the current selected power level is not a minimum power level, the method may proceed to block 412. At block 412, the selected power level for the second wireless radio 102(2) may be decreased. Then, blocks 402 through 406 may be repeated using the decreased power level for the second wireless radio 102(2). If the signal quality value for the first wireless radio 102(1) does not decrease by at least the threshold amount when the decreased selected power level is used by the second wireless radio 102(2), the method may proceed to block 408, and the first wireless radio 102(1) may be configured to use the selected frequency while the second wireless radio 102(2) is configured to use the decreased selected power level. If the signal quality for the first wireless radio 102(1) decreases by at least the threshold amount when the decreased selected power level is used by the second wireless radio 102(2), block 410 may be repeated to determine whether the selected power level may be further decreased.

If the selected power level for the second wireless radio 102(2) is a minimum power level, then the method may proceed to block 414. At block 414, the first wireless radio 102(1) may be configured to exclude the selected frequency from use transmitting signals. For example, if transmissions by the second wireless radio 102(2) decrease the signal quality value associated with the first wireless radio 102(1) by at least a threshold value, even if a minimum power level is used by the second wireless radio 102(2), restricting the selected frequency from use by the first wireless radio 102(1) may limit or prevent the interference 104 caused by the second wireless radio 102(2).

At block 416, a determination may be made as to whether a frequency usable by the second wireless radio 102(2) remains for which a signal quality has not been determined for the first wireless radio 102(1). Blocks 402 through 414 may be repeated for each frequency at which the second wireless radio 102(2) is capable of transmitting signals. If a signal quality value has been determined for each frequency useable by the second wireless radio 102(2), the frequencies determined at blocks 408 and 414 and the power levels determined at block 408 may be used to generate a frequency configuration 126 for the first wireless radio 102(1) and a corresponding power configuration for the second wireless radio 102(2). For example, a frequency configuration 126 that enables continued use of the first wireless radio 102(1) without transmission failures caused by interference 104 from the second wireless radio 102(2) may exclude use of frequencies for which the signal quality value deviated from a threshold signal quality value by at least a threshold amount, even when a minimum power level was used by the second wireless radio 102(2). A power configuration that enables continued use of the first wireless radio 102(1) without transmission failures caused by interference 104 from the second wireless radio 102(2) may limit the power level of the second wireless radio 102(2) to the power levels determined at block 408, for the corresponding selected frequencies.

Figure 5:
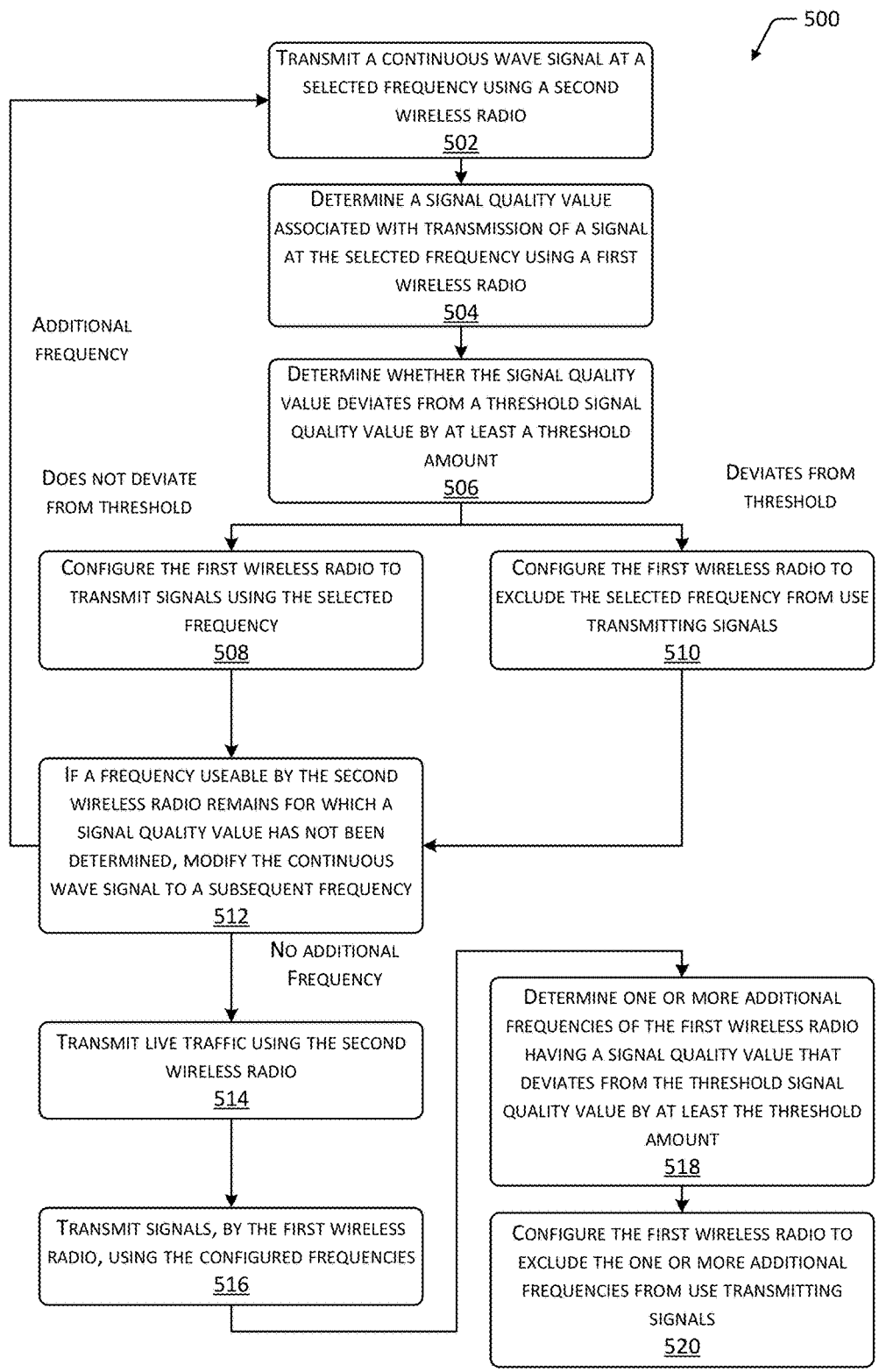
FIG. 5 is a flow diagram illustrating a method for configuring frequencies used by a first wireless radio using continuous wave signals and live traffic transmit by a second wireless radio.

FIG. 5 is a flow diagram 500 illustrating a method for configuring frequencies used by a first wireless radio 102(1) using continuous wave signals and live traffic transmit by a second wireless radio 102(2). At block 502, a continuous wave signal may be transmitted by a second wireless radio 102(2) at a selected frequency. Use of a continuous wave signal may enable the presence of a transmission by the second wireless radio 102(2) at the selected frequency to be continuously present while signal quality values associated with the first wireless radio 102(1) are determined. In other implementations, other types of signals may be transmitted using the second wireless radio 102(2).

At block 504, a signal quality value associated with transmission of a signal at the selected frequency using the first wireless radio 102(1) may be determined. For example, the first wireless radio 102(1) may be used to transmit a signal concurrent with the transmission by the second wireless radio 102(2) at block 502. The signal quality value for the first wireless radio 102(1) may be affected by interference 104 from the second wireless radio 102(2). In some implementations, the signal quality value may be determined using the first wireless radio 102(1) or another module associated with a wireless communication device 106 that includes the first wireless radio 102(1). In other implementations, one or more other devices in communication with the first wireless radio 102(1) may determine the signal quality value.

At block 506, a determination may be made as to whether the signal quality value determined at block 504 deviates from a threshold signal quality value by at least a threshold amount. Deviation of the signal quality value from the threshold signal quality value may indicate that interference 104 caused by use of the second wireless radio 102(2) is affecting the signal quality associated with the first wireless radio 102(1). If the signal quality value does not deviate from the threshold signal quality value by at least the threshold amount, the method may proceed to block 508. At block 508, the first wireless radio 102(1) may be configured to transmit signals using the selected frequency. For example, if transmissions by the second wireless radio 102(2) do not significantly interfere with transmissions by the first wireless radio 102(1) at the selected frequency, then the first wireless radio 102(1) may continue using the selected frequency concurrent with use of the second wireless radio 102(2) without significantly reducing the quality of communications using the first wireless radio 102(1). If the signal quality value deviates from the threshold signal quality value by at least the threshold value, the method may proceed to block 510. At block 510, the first wireless radio 102(1) may be configured to exclude the selected frequency from use transmitting signals. For example, if the signal quality value for the first wireless radio 102(1) indicates that interference 104 from the second wireless radio 102(2) is significantly reducing the signal quality for transmissions by the first wireless radio 102(1) at a selected frequency, use of this frequency by the first wireless radio 102(1) may be excluded. Exclusion of affected frequencies may enable continued use of the first wireless radio 102(1) while avoiding transmission failures or erroneous packets caused by interference 104 from the second wireless radio 102(2).

At block 512, a determination may be made as to whether a frequency usable by the second wireless radio 102(2) remains for which a signal quality has not been determined for the first wireless radio 102(1). Blocks 502 through 510 may be repeated for each frequency at which the second wireless radio 102(2) is capable of transmitting signals. For example, the continuous wave signal transmitted by the second wireless radio 102(2) may be modified to a subsequent frequency. If a signal quality value has been determined for a selected portion of the frequencies useable by the second wireless radio 102(2), the frequencies determined at blocks 508 and 510 may be used to generate a frequency configuration 126 for the first wireless radio 102(1). For example, a frequency configuration 126 that enables continued use of the first wireless radio 102(1) without transmission failures caused by interference 104 from the second wireless radio 102(2) may exclude use of frequencies for which the signal quality value deviated from a threshold signal quality value by at least a threshold amount.

If no additional frequency useable by the second wireless radio 102(2) is to be used, the method may proceed to block 514. At block 514, live traffic may be transmitted using the second wireless radio 102(2). Live traffic may include data carried by multiple frequencies, including frequencies that overlap with the continuous wave signals transmitted at block 502 and in some cases, frequencies that differ from the continuous wave signals. Thus, in some cases, live traffic may affect the transmissions of the first wireless radio 102(1) differently than continuous wave signals.

At block 516, the first wireless radio 102(1) may transmit signals, using the configured frequencies determined at block 508. At block 518, one or more additional frequencies of the first wireless radio 102(1) that have an associated signal quality value that deviates from the threshold signal quality value by at least the threshold amount may be determined. At block 520, the first wireless radio 102(1) may be configured to transmit signals without using the additional frequencies. Transmission of live traffic by the second wireless radio 102(2) may therefore be used to modify and refine the frequency configuration 126 determined using continuous wave signals.

Figure 6:
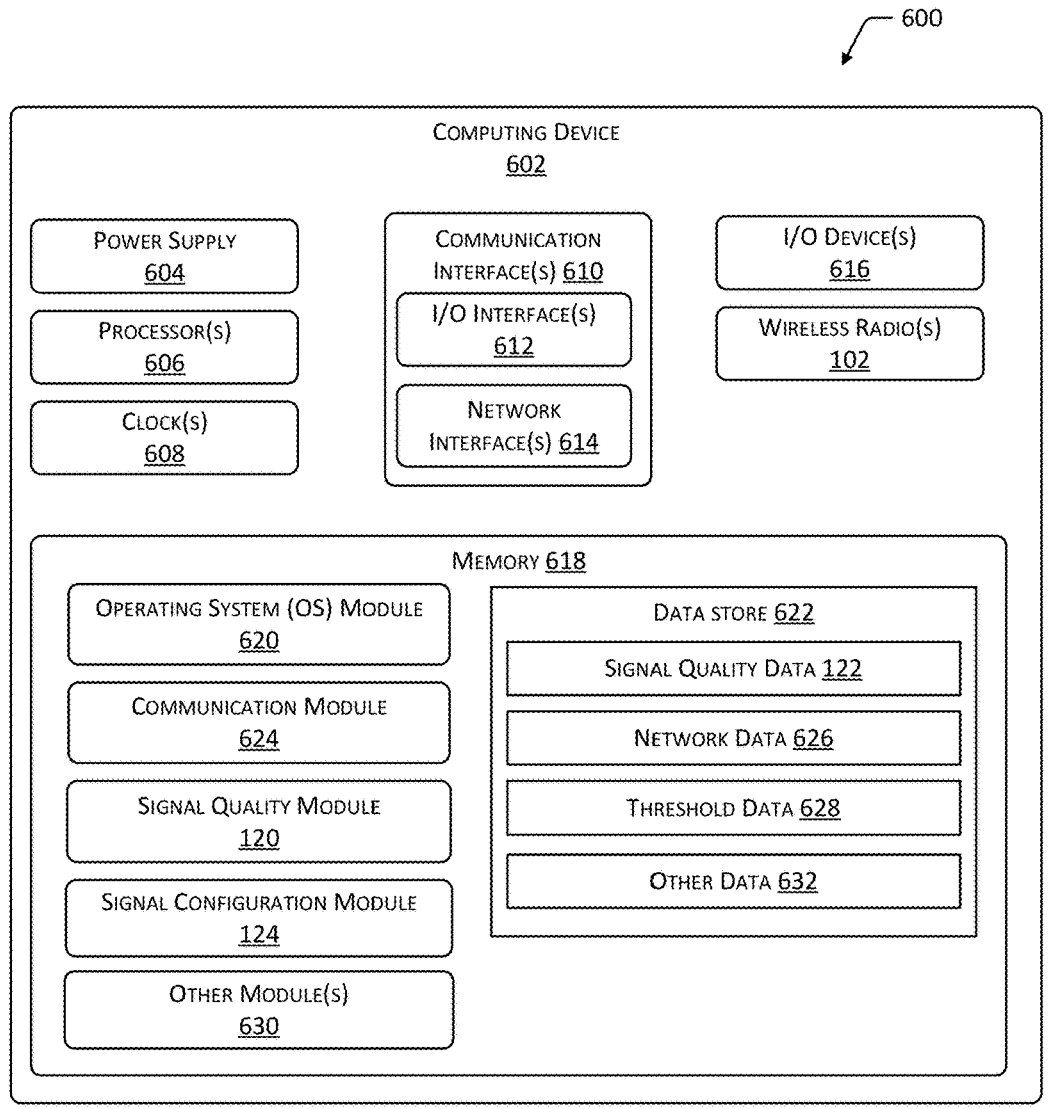
FIG. 6 is a block diagram illustrating a computing device within the scope of the present disclosure.

FIG. 6 is a block diagram 600 illustrating a computing device 602 within the scope of the present disclosure. The computing device 602 may include a wireless communication device 106 or another computing device 602 in communication with the wireless communication device 106, such as a server, a Wi-Fi device 108, a Bluetooth device 114, or another computing device 602. While FIG. 6 depicts a single computing device 602, in other implementations, the functions described with regard to the computing device 602 may be performed by any number and any type of computing devices 602. For example, the functions described herein may be performed by the wireless communication device 106, a distributed group of local computing devices 602 associated with a network, one or more servers or other remote computing devices 602, and so forth.

One or more power supplies 604 may be configured to provide electrical power suitable for operating the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth. As another example, data from a clock 608 may be used to determine the passage of a length of time associated with a grant to a computing device 602 to use a network to receive data.

The computing device 602 may include one or more communication interface(s) 610, such as input/output (I/O) interface(s) 612, network interface(s) 614, and so forth. The communication interfaces 610 may enable the computing device 602, or components of the computing device 602, such as wireless radios 102, to communicate with other computing devices 602 or components thereof. The I/O interface(s) 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O device(s) 616. The I/O devices 616 may include any manner of input device or output device associated with the computing device 602 or with another computing device 602 in communication therewith. For example, I/O devices 616 may include touch sensors, keyboards, mouse devices, microphones, image sensors (e.g., cameras), scanners, displays, speakers, haptic devices, printers, motion sensors, location sensors, and so forth. In some implementations, the I/O device(s) 616 may be physically incorporated with a computing device 602 or may be externally placed.

The network interface(s) 614 may be configured to provide communications between the computing device 602 and other devices, such as the I/O devices 616, routers, access points, and so forth. The network interface(s) 614 may include devices configured to couple to one or more networks, including local area networks (LANs), wireless LANs, wide area networks (WANs), wireless WANs, and so forth. For example, the network interfaces 614 may include computing devices 602 compatible with Ethernet, Wi-Fi, Wi-Fi Direct, Bluetooth, Bluetooth Low Energy, ZigBee, Z-Wave, 3G, 4G, LTE, and so forth.

The computing device 602 may include one or more busses or other internal communications hardware or software that allows for the transfer of data between the various modules and portions of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processor(s) 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 622 and one or more of the following modules may also be stored in the memory 618. The modules may be executed as foreground applications, background tasks, daemons, and so forth. The data store 622 may use a flat file, database, linked list, tree, executable code, script, or other data structure to store information. In some implementations, the data store 622 or a portion of the data store 622 may be distributed across one or more other devices including other computing devices 602, network attached storage devices, and so forth.

A communication module 624 stored in the memory 618 may be configured to establish communications with other computing devices 602.

The memory 618 may also store the signal quality module 120. The signal quality module 120 may determine signal quality data 122 based on transmissions by a wireless radio 102. For example, the signal quality module 120 may determine one or more of a PER, RSSI, RCPI, SNR, or data transfer rate associated with a signal transmitted by a wireless radio 102. In some implementations, the signal quality module 120 may directly measure the signal quality data 122. In other implementations, the signal quality module 120 may receive at least a portion of the signal quality data 122 from one or more other computing devices 602. For example, a device receiving a communication signal from a wireless communication device 106 may provide data indicative of the signal strength of the communication signal.

The memory 618 may additionally store the signal configuration module 124. The signal configuration module 124 may generate a frequency configuration 126 based on the frequencies used by multiple wireless radios 102, which may be indicated as network data 626, and the signal quality data 122. For example, network data 626 may indicate the frequency range that corresponds to a Wi-Fi communication channel 110, and the frequencies and count of Wi-Fi subcarriers 202 associated with the Wi-Fi communication channel 110. One or more of the signal quality module 120 or the signal configuration module 124 may cause the determination of signal quality data 122 corresponding to each frequency that is common to multiple wireless radios 102 of the computing device 602. The signal configuration module 124 may then determine correspondence between the signal quality data 122 and threshold data 628. For example, the threshold data 628 may indicate threshold minimum or maximum signal quality values, such as a maximum packet error rate value or a minimum RSSI value. If the signal quality data 122 for a particular frequency exceeds a threshold maximum value or falls below a threshold minimum value, that particular frequency may be excluded from the frequency configuration 126. As another example, threshold data 628 may indicate a threshold amount by which a signal quality value may deviate from a baseline value or other threshold value. If the signal quality data 122 for a particular frequency deviates from a threshold value by more than a threshold amount, that particular frequency may be excluded from the frequency configuration 126.

In some implementations, one or more of the signal quality module 120 or the signal configuration module 124 may determine signal quality data 122 for multiple frequencies at various power levels associated with one or more of the wireless radios 102. For example, a signal associated with a particular frequency that is transmitted using a first power level may interfere with a signal associated with a different wireless radio 102, while transmission of the signal using a second power level less than the first power level may avoid such interference. Determined power levels that avoid interference may be stored as a power configuration for a wireless radio 102.

In some implementations, the signal configuration module 124 or one or more other modules 630 associated with the computing device 602 may control use of particular antennae associated with the wireless radios 102. For example, a first wireless radio 102(1) may include multiple antennae, each of which is isolated from an antenna of a second wireless radio 102(2) by a respective distance. Each antenna of the first wireless radio 102(1) may be associated with an isolation value that results from the amount of physical distance between that antenna and the antenna of the second wireless radio 102(2). The antenna associated with the largest isolation value may be less affected by interference 104 caused by the second wireless radio 102(2). Therefore, in some cases, the first wireless radio 102(1) may be configured to use the antenna associated with the largest isolation value while excluding one or more other antennae associated with smaller isolation values from use.

Other modules 630 may also be present in the memory 618. For example, other modules 630 may include user interface modules for receiving user input, such as commands to generate an output, initiate or terminate a communication session, modify threshold data 628 or network data 626, and so forth. Other modules 630 may also include encryption modules to encrypt and decrypt communications between computing devices 602. Other modules 630 may also include configuration modules to receive and modify user settings, configurations, and preferences, default settings, and so forth.

Other data 632 within the data store 622 may include default configurations and settings associated with computing devices 602, security data, such as encryption keys and schema, access credentials, and so forth.

In different implementations, different computing devices 602 may have different capabilities or capacities. For example, servers may have significantly more processor 606 capability and memory 618 capacity compared to the processor 606 capability and memory 618 capacity of a wireless communication device 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a first radio configured to transmit signals using a Wi-Fi channel having a first subcarrier that includes a first frequency and a second subcarrier that includes a second frequency;
a second radio configured to transmit signals using a Bluetooth communication link;
one or more memories storing computer-executable instructions; and
one or more hardware processors to execute the computer-executable instructions to:
transmit a first signal on the Wi-Fi channel using the first radio using the first subcarrier;
determine a baseline packet error rate associated with transmission of the first signal;
determine a threshold error rate;
transmit a second signal on the Wi-Fi channel using the first radio and the first subcarrier;
transmit, using the second radio, a first continuous wave signal at a first frequency using the Bluetooth communication link, concurrent with transmission of the second signal using the first radio, wherein the first frequency of the first continuous wave signal corresponds to the first frequency of the first subcarrier of the Wi-Fi channel;
determine a first packet error rate associated with transmission of the second signal concurrent with transmission of the first continuous wave signal at the first frequency;
determine that the first packet error rate exceeds the baseline packet error rate by at least the threshold error rate, wherein the first packet error rate corresponds to interference to the second signal on the Wi-Fi channel caused by transmission of the first continuous wave signal at the first frequency;
transmit a third signal on the Wi-Fi channel using the first radio and the second subcarrier;
transmit, using the second radio, a second continuous wave signal at a second frequency using the Bluetooth communication link, concurrent with transmission of the third signal using the first radio, wherein the second frequency of the second continuous wave signal corresponds to the second frequency used by the second subcarrier of the Wi-Fi channel;
determine a second packet error rate associated with transmission of the third signal concurrent with transmission of the second continuous wave signal at the second frequency;
determine that the second packet error rate does not exceed the baseline packet error rate by at least the threshold error rate; and
configure the second radio to transmit a fourth signal using the second frequency and without using the first frequency.

2. The system of claim 1, further comprising computer-executable instructions to:
determine one or more of a baseline signal strength value or a baseline data transfer rate associated with transmission of the first signal;
determine one or more of a first signal strength value or a first data transfer rate associated with transmission of the second signal;
determine that the first signal strength value exceeds the baseline signal strength value by at least a first threshold value or the first data transfer rate exceeds the baseline data transfer rate by at least a second threshold value, wherein the first threshold value and the second threshold value correspond to the interference to transmission of signals on the Wi-Fi channel caused by transmission of signals on the Bluetooth communication link;
determine one or more of a second signal strength value or a second data transfer rate associated with transmission of the third signal; and
determine that the second signal strength value does not exceed the baseline signal strength value by at least the first threshold value or the second data transfer rate does not exceed the baseline data transfer rate by at least the second threshold value.

3. The system of claim 1, further comprising computer-executable instructions to:
transmit the first continuous wave signal at a first power level;
in response to determining that the first packet error rate exceeds the baseline packet error rate by at least the threshold error rate, transmit, using the second radio, a third continuous wave signal at a second power level less than the first power level, wherein the third continuous wave signal is transmitted at the first frequency using the Bluetooth communication link, concurrent with transmission of the first signal using the first radio;
determine a third packet error rate associated with transmission of the third signal;
determine that the third packet error rate exceeds the baseline packet error rate by at least the threshold error rate; and
configure the first radio to transmit a fourth signal without using the first frequency of the first subcarrier in response to the third packet error rate exceeding the baseline packet error rate by at least the threshold error rate.

4. The system of claim 1, further comprising computer-executable instructions to:
transmit the third signal using a third subcarrier of the Wi-Fi channel using the first radio, the third subcarrier including a third frequency;
transmit, using the second radio, Bluetooth data that includes a plurality of signals;

determine a third packet error rate associated with transmission of the third signal;
determine that the third packet error rate exceeds the baseline packet error rate by at least the threshold error rate;
determine the third frequency is associated with the Bluetooth data;
determine the third frequency of the third subcarrier of the Wi-Fi channel corresponds to the third frequency associated with the Bluetooth data; and
configure the first radio to transmit a fourth signal without using the third subcarrier.

5. A method comprising:
configuring a first radio to use a communication channel to transmit a first signal using a first communication protocol having a first subset of a frequency range of the communication channel that includes a first frequency and to transmit a second signal using a second subset of the frequency range of the communication channel that includes a second frequency;
transmitting, using the first radio, the first signal on the communication channel using the first subset of the frequency range;
determining the first signal has a first signal quality;
transmitting, using the first radio, the second signal on the communication channel using the first subset of the frequency range;
transmitting, using a second radio, a third signal associated with a second communication protocol, wherein the third signal is transmitted using the first frequency and is transmitted concurrently with the second signal;
determining a second signal quality of the second signal that is transmitted concurrently with transmission of the third signal, the second signal quality being lower than the first signal quality;
transmitting, using the first radio, a fourth signal on the communication channel using the second subset of the frequency range;
transmitting, using the second radio, a fifth signal using the second frequency, the fifth signal transmitted concurrently with the fourth signal;
determining a third signal quality of the fourth signal, the third signal quality exceeding the first signal quality; and
based on the third signal quality exceeding the first signal quality, transmitting, using the first radio, a sixth signal using the second subset.

6. The method of claim 5, further comprising:
transmitting, using the second radio, a seventh signal associated with the second communication protocol, wherein the seventh signal is transmitted at a second frequency; and
determining, concurrent with transmission of the fourth signal, a fourth signal quality of the fourth signal; and
determining that the fourth signal quality is greater than a threshold minimum signal quality, wherein the threshold minimum signal quality is indicative of interference to the fourth signal caused by the seventh signal;
wherein transmission of an eighth signal by the first radio uses the second subset.

7. The method of claim 5, further comprising:
transmitting, using the second radio, a seventh signal associated with the second communication protocol, wherein the seventh signal is transmitted at the second frequency using a first power level;
determining, concurrent with transmission of the seventh signal, a fourth signal quality of the third signal; and
determining that the fourth signal quality is less than a threshold minimum signal quality, wherein the threshold minimum signal quality is indicative of interference to the third signal caused by the seventh signal;
wherein transmission of an eighth signal by the first radio uses the second subset.

8. The method of claim 5, further comprising:
transmitting, using the second radio, a seventh signal associated with the second communication protocol, wherein the seventh signal is transmitted at a second frequency using a first power level;
determining, concurrent with transmission of the seventh signal, a fourth signal quality of the fourth signal;
determining that the fourth signal quality is less than a threshold minimum signal quality, wherein the threshold minimum signal quality is indicative of interference to the fourth signal caused by the seventh signal;
transmitting, using the second radio, an eighth signal associated with the second communication protocol, wherein the eighth signal is transmitted at the second frequency using a second power level less than the first power level;
determining, concurrent with transmission of the eighth signal, that a fifth signal quality of a fourth signal transmitted by the first radio is greater than the threshold minimum signal quality; and
configuring the second radio to transmit signals at the second frequency using a third power level less than or equal to the second power level.

9. The method of claim 8, further comprising:
generating a data structure that associates the second frequency with one or more of the second power level or the third power level, wherein the data structure further associates the first frequency with an indication that the first subset is excluded from use by the first radio due to interference to the third signal caused by signals transmitted by the second radio using the first frequency;
determining that the first subset is excluded from use by the first radio due to interference caused by signals transmitted by the second radio using the first frequency;
transmitting, using the first radio, the seventh signal using the second subset of the frequency range of the communication channel;
determining data associated with the second communication protocol, wherein the data includes at least one signal associated with the second frequency; and
in response to correspondence between the data structure and one or more frequencies associated with the at least one signal, causing the second radio to transmit the at least one signal of the data using the one or more of the second power level or the third power level.

10. The method of claim 5, further comprising:
determining a baseline signal quality value associated with the first radio;
determining a current signal quality value associated with transmission of the fourth signal concurrent with transmission of the fifth signal;
determining a difference between the current signal quality value and the baseline signal quality value; and
determining that the difference exceeds a threshold signal quality value, wherein the threshold signal quality value is indicative of interference to the fourth signal caused by the fifth signal.

11. The method of claim 5, further comprising:
transmitting, using the second radio, data associated with the second communication protocol, wherein the data includes a plurality of signals;
determining that the third signal quality associated with the fourth signal is less than a threshold minimum signal quality indicative of interference to the third signal caused by the fifth signal;
determining a second frequency associated with the data; and
configuring the first radio to transmit signals using a third subset that excludes the second frequency.

12. The method of claim 5, wherein the first radio includes a first antenna and a second antenna, the method further comprising:
determining a first isolation value associated with the first antenna, wherein the first isolation value indicates an amount of isolation between the first antenna and a third antenna of the second radio;
determining a second isolation value associated with the second antenna, wherein the second isolation value indicates an amount of isolation between the second antenna and the third antenna;
determining that the first isolation value is greater than the second isolation value; and
in response to the second signal quality being lower than the first signal quality, configuring the first radio to transmit signals associated with the first subset using the first antenna without using the second antenna.

13. The method of claim 5, wherein the second signal is transmitted using a first power level, the method further comprising:
generating a data structure associating the first subset with non-use and the second subset with a power level;
determining correspondence between the data structure and data associated with the second radio, wherein the data includes at least one signal associated with the first frequency; and
based on the correspondence between the data structure and the data, configuring the first radio to transmit signals using the second subset that excludes the first frequency.

14. A system comprising:
one or more memories storing computer-executable instructions;
one or more hardware processors to execute the computer-executable instructions to:
configure a first radio to use a communication channel having a frequency range to transmit using a first communication protocol, the first communication protocol using a first subset of the frequency range that includes a first frequency and a second subset of the frequency range that includes a second frequency;
transmit a first signal using the first radio, wherein the first signal is transmitted using the first subset;
transmit a second signal at the first frequency and at a first power level using a second radio, wherein the second signal is associated with a second communication protocol and is transmitted concurrently with the first signal;
determine a first signal quality value associated with the first signal;
determine that a first change in the first signal quality value exceeds a threshold value indicative of interference to the first signal caused by the second signal;
transmit, concurrently with the first signal, a third signal at the first frequency using the second radio, wherein the third signal corresponds to the second communication protocol and is transmitted at a second power level less than the first power level;
determine a second signal quality value associated with the first signal;
determine that a second change in the second signal quality value is lower than the threshold value; and
configure the second radio to provide transmissions using the second frequency outside of a threshold range of the first frequency and at the second power level.

15. The system of claim 14, further comprising computer-executable instructions to:
transmit a fourth signal at a second frequency using the second radio, wherein the fourth signal corresponds to the second communication protocol and is transmitted at a third power level;
determine a third signal quality value associated with the first radio;
determine that a third change in the third signal quality value exceeds the threshold value;
transmit a fifth signal at the second frequency using the second radio, wherein the fifth signal is transmitted at the second frequency and is transmitted at a fourth power level less than the third power level;
determine a fourth signal quality value associated with the first radio;
determine that a fourth change in the fourth signal quality value does not exceed the threshold value; and
configure the second radio to provide transmissions within the threshold range of the second frequency using a fifth power level less than or equal to the fourth power level.

16. The system of claim 14, further comprising computer-executable instructions to:
determine a baseline signal quality value associated with the first radio;
determine, concurrent with transmission of the second signal, a current signal quality value associated with the first radio; and
determine the first change based on a difference between the current signal quality value and the baseline signal quality value.

17. The system of claim 14, further comprising computer-executable instructions to:
transmit, using the second radio, data associated with the second communication protocol, wherein the data includes a plurality of signals;
determine a third signal quality value associated with the first radio;
determine that a third change in the third signal quality value exceeds the threshold value;
determine a third frequency associated with at least one signal of the plurality of signals;
determine the first subset includes the third frequency and the second subset excludes the third frequency; and
configure the first radio to transmit signals using the second subset.

18. The system of claim 14, wherein the first radio includes a first antenna and a second antenna, the system further comprising computer-executable instructions to:
determine a first isolation value associated with the first antenna, wherein the first isolation value indicates a first amount of isolation between the first antenna and a third antenna of the second radio;

determine a second isolation value associated with the second antenna, wherein the second isolation value indicates a second amount of isolation between the second antenna and the third antenna;

determine, based on the first isolation value and the second isolation value, that the first amount of isolation is greater than the second amount of isolation; and in response to the first change in the first signal quality value exceeding the threshold value, configuring the first radio to transmit signals without using the second antenna.

19. The system of claim 14, further comprising computer-executable instructions to:

transmit a fourth signal at a third frequency using the second radio, wherein the fourth signal corresponds to the second communication protocol and is transmitted at a third power level;

determine a third signal quality value associated with the first radio;

determine that a third change in the third signal quality value does not exceed the threshold value;

generate a data structure that associates the third frequency with the third power level;

determine correspondence between the data structure and data transmitted by the second radio, wherein the data includes a plurality of signals; and based on the correspondence between the data structure and the data, determine a power level for use with at least one signal of the plurality of signals.

20. The system of claim 14, further comprising computer-executable instructions to:

transmit a fourth signal at a third frequency using the second radio, wherein the fourth signal corresponds to the second communication protocol and is transmitted at a third power level;

determine a third signal quality value associated with the first radio;

determine that a third change in the third signal quality value does not exceed the threshold value;

generate a data structure that associates the first frequency with non-use by the first radio and the third frequency with the third power level;

determine correspondence between the data structure and data associated with the second radio, wherein the data includes at least one signal associated with the third frequency; and based on the correspondence between the data structure and the data, configure the first radio to transmit signals using a third subset that excludes the first frequency.

* * * * *